United States Patent [19]

Rogers et al.

[11] Patent Number: 4,659,523

[45] Date of Patent: Apr. 21, 1987

[54] PRODUCTION OF IODINE STAINABLE POLYESTER POLARIZER FILM

[75] Inventors: John H. Rogers, Greenville; Michael J. Hopper, Taylors; Michael R. Martin, Greenville, all of S.C.

[73] Assignee: American Hoechst Corporation, Somerville, N.J.

[21] Appl. No.: 676,980

[22] Filed: Nov. 30, 1984

[51] Int. Cl.$^4$ .............................................. B29D 7/00
[52] U.S. Cl. ............................ 264/1.3; 8/489; 264/78; 264/135; 264/210.2; 264/210.4; 427/163
[58] Field of Search ............... 264/1.3, 185, 210.2, 264/210.3, 210.4, 78, 171, 135; 427/163; 8/489

[56] References Cited

U.S. PATENT DOCUMENTS

| 4,268,127 | 5/1981 | Oshima et al. |         |
|-----------|--------|---------------|---------|
| 4,388,375 | 6/1983 | Hopper et al. |         |
| 4,396,642 | 8/1983 | Bolt et al.   | 427/163 |
| 4,476,189 | 10/1984| Posey         | 428/336 |

FOREIGN PATENT DOCUMENTS

| 0089493 | 9/1983  | European Pat. Off. |         |
|---------|---------|--------------------|---------|
| 117107  | 9/1980  | Japan              | 427/163 |
| 33612   | 4/1981  | Japan              | 427/163 |
| 158301  | 12/1981 | Japan              | 264/1.3 |
| 98709   | 6/1983  | Japan              | 427/163 |

*Primary Examiner*—James Lowe
*Attorney, Agent, or Firm*—James C. Lydon; James R. Cartiglia

[57] ABSTRACT

A process for preparing an iodine stainable polyester polarizer film which comprises:
  (a) extruding a moving molten web of polyester film; and
  (b) quenching said moving web to solidify it in a substantially amorphous form; and
  (c) applying an anchor coating to at least a portion of the surface of said film wherein said anchor coating improves adhesion of polyvinyl alcohol to polyester film; and
  (d) applying a coating of a dispersed aqueous composition of polyvinyl alcohol to at least a portion of the surface of said film; and
  (e) stretching said moving web in a direction transverse to the direction of motion while heating said web at a temperature of from about its glass transition temperature to about 160° C.; and
  (f) crystallizing said moving web by heating it to a temperature in the range of 130° C. to 240° C. without stretching said web; and
  (g) cooling said web to substantially ambient atmospheric temperature.

16 Claims, No Drawings

PRODUCTION OF IODINE STAINABLE POLYESTER POLARIZER FILM

BACKGROUND OF THE INVENTION

It has been a problem in the art to produce a clear, thermoplastic film which is tough, chemically resistant and which is useful for optically critical purposes such as a polarizer. Biaxially oriented polyester film, while it is clear and tough, has an optic axis plane angle which varies from point to point across the web. This variation of orientation of the optic axis plane precludes the use of biaxially oriented polyester film for most such optically critical applications.

In the production of polarizing sheets by prior art methods, a film of a substrate is laminated to a film of polyvinyl alcohol as shown by U.S. Pat. No. 4,388,375. This laminate may then be passed through an aqueous staining bath containing iodine and one or more iodide salts to tint the polyvinyl alcohol film. Certain other stabilizing treatments are then employed.

The present invention provides an improved polarized sheeting. Such improved sheeting possesses a very low extinction angle, thus making it highly useful for polarizing applications, and at the same time demonstrates increased adhesion to the polyvinyl alcohol coating thereon. It also demonstrates improved thermal dimensional stability, an improved moisture barrier and reduced water and solvent content. This film may be directly iodine stainable without the need for the formation of a laminate.

SUMMARY OF THE INVENTION

The present invention provides an iodine stainable polyester polarizer film which is produced by the process of:

(a) extruding a moving molten web of polyester film; and
(b) quenching said moving web to solidify it in a substantially amorphous form; and
(c) applying an anchor coating to at least a portion of the surface of said film wherein said anchor coating promotes adhesion of polyvinyl alcohol to polyester film; and
(d) applying a coating comprising a dispersed aqueous composition of polyvinyl alcohol to at least a portion of the surface of said film; and
(e) stretching said moving web in a direction transverse to the direction of motion while heating said web at a temperature of from about its glass transition temperature to about 160° C.; and
(f) crystallizing said moving web by heating it to a temperature in the range of 130° C. to 240° C. without stretching said web; and
(g) cooling said web to substantially ambient atmospheric temperature.

DETAILED DESCRIPTION OF THE INVENTION

The present invention provides a clear, flexible, uniaxially oriented polyester polarizer film which exhibits the quality physical characteristics of conventional polyester films and exhibits the optically desirable quality of having a 0° to 6° extinction angle and is directly iodine stainable.

An important feature of the produced film is that it has a very low extinction angle. Extinction is the condition exhibited by a crystal when its optic axial plane is aligned with one of a pair of crossed polaroids. The extinction angle is the angle through which a crystal is revolved from a definite line (as that of the crystallographic axis) to the plane of maximum extinction. For a birefringent film, the extinction angle is the inclination of the optic axial plane to the transverse stretch direction. The extinction angle of the present film is to be as close to zero degrees as possible. The angle may range from 0° to 6°, preferably 0° to 3° and most preferably 0°.

The flexible polyester film of the present invention may be any flexible film formed from any thermoplastic film forming polyester which is produced by condensing a dicarboxylic acid or a lower alkyl diester thereof with a glycol. Among the dicarboxylic acids and their lower alkyl diesters which may be employed to form a flexible polyester film support are terephthalic; isophthalic; phthalic; 2,5-,2,6-, and 2,7-naphthalene dicarboxylic; succinic; sebacic; adipic; azelaic; bibenzoic; the hexahydrophthalics, and bis-p-carboxyphenoxyethane. One or more of these acids and/or their lower alkyl diesters is reacted with one or more glycols which include ethylene glycol; diethylene glycol; 1,3-propanediol; 1,4-butanediol; neopentyl glycol or 1,4-cyclohexanedimethanol. Since one or more diesters may be reacted with one or more glycols, the polyester film of this invention is not limited to homopolyesters, but also includes mixed polyesters such as copolyesters. Of the film forming polyesters within the contemplation of this invention, preferred are those containing at least a major amount of polyethylene terephthalate, the most preferred being polyethylene terephthalate.

In a preferred embodiment, the polyester film forming polymer is melted and thereafter extruded onto a polished revolving casting drum to form a cast, flexible sheet of the polymer. The polyester film is then coated with an anchor coating to promote adhesion of the polyvinyl alcohol coating subsequently applied. The polyester film is then coated with a substantially clear coating comprising a dispersed aqueous composition of polyvinyl alcohol (PVA). Thereafter, the film is uniaxially stretched in a tenter frame while being heated to a temperature in the range of 80° C. to 160° C., preferably in the range of 90° C. to 100° C. The stretched film is stretched about 2 to 6 times its original dimension and preferably 2.5 to 4.5 times, most preferably 4 times. It is important that the stretching temperature is above the glass transition temperature of the film. The film is then crystallized by heating to a temperature of from about 130° C. to about 240° C., preferably 150° C. to 180° C., while being transversely restrained but without film stretching. Crystallizing is normally complete when this treatment is performed for about five seconds or more. The film is then cooled to substantially ambient atmospheric room temperature. The thusly produced film may have a thickness of from 0.48 to 30 mils, preferably 1 to 9 mils, most preferably 3 to 7 mils.

In the preferred embodiment, the polyester film is first primed with an anchor coating to promote adhesion of the polyvinyl alcohol coating to the polyester film. An anchor coating suitable for use in the invention may be produced by polycondensing (A) terephthalic acid; (B) an aliphatic dicarboxylic acid having the formula HOOC(CH$_2$)$_n$COOH, n being 1-11; (C) a sulfomonomer containing an alkali metal sulfonate group attached to a difunctional dicarboxylic aromatic nucleus; and (D) at least one aliphatic or cycloaliphatic alkylene glycol having from about 2-11 carbon atoms, such as disclosed in U.S. Pat. No. 4,476,189, the disclosure of which is hereby incorporated by reference herein. In the preferred embodiment, the anchor coating is an aqueous solution having an applied solids level of from about 3% to about 22%, more preferably from about 5% to about 17% and most preferably about 10%, although the skilled artisan may use more or less according to his purposes. The anchor coating may be applied to the polyester film by any of the well known techniques employed in the art. For example, coating may be effected by roller coating, spray coating, slot coating or immersion coating. In a preferred embodiment, the polyester film is coated by means of gravure roller coating. The anchor coating is coated onto the polyester film at a dry coating weight of from about 0.01 to about 0.2 pounds per thousand square feet of film before stretching. More preferably, the dry coating weight of the anchor coating is from about 0.025 to about 0.1 pounds per thousand square feet of film before stretching and it is most preferably about 0.05.

In the preferred embodiment, the dispersed polyvinyl alcohol composition is an aqueous solution of polyvinyl alcohol containing from about 2% to about 25% solids by weight, preferably 5% to 22%, most preferably 15% to 20% although the skilled artisan may use more or less according to his purposes. The polyvinyl alcohols useful in this invention are hydrolyzed from about 95% to about 99%. 95% to 99% hydrolization means that when polyvinyl acetate was reacted to form polyvinyl alcohol, from about 95% to about 99% of the acetate groups were replaced by hydroxyl groups. It has been found that polyvinyl alcohol with appreciably lower degrees of hydrolysis does not exhibit suitable water stability and may wash off in the iodine staining bath whereas polyvinyl alcohol with greater than 99% hydrolysis may not allow the water to penetrate deeply enough to allow for adequate iodine staining. The coating composition may be applied by those methods described above and is preferably gravure rolled onto the polyester substrate at a coating weight of from about 0.1 to about 3.0 dry pounds of coating per thousand square feet of film before stretching, more preferably from about 0.7 to about 2.1 and most preferably about 1.5, although the skilled artisan may use more or less according to his purposes. The most preferred polyvinyl alcohol is Vinol 107 which is a 98.0%-98.8% hydrolyzed polyvinyl alcohol of Air Products, Inc. of Greenville, South Carolina.

An additional criterion in judging compositions useful in the context of the present invention includes a high degree of clarity when the polyester is coated, stretched and crystallized. Also, the coating should not be so soft as to cause the film to block when being rolled.

Cross-linking agents may also be contained in the polyvinyl alcohol coating composition to cross-link the free hydroxyl groups with each other and with the polymeric substrate in order to promote adhesion and reduce the moisture sensitivity of the coated film. Suitable cross-linking agents include aziridines, urea formaldehyde and trimethylol melamine type compounds. Additionally, if a side of the polyester film is not coated with the polyvinyl alcohol, it may be coated with a non-transferring slip promoting material such as silicone or a polymethylmethacrylate dispersion prior to uniaxially orienting the film.

The polyvinyl alcohol coated film may be stained by running it through an iodine bath, which also contains an iodide salt such as potassium iodide, and then through a stabilizing boronic treatment such as an aqueous solution of borax and boric acid as is well known in the art.

In the preferred embodiment, the staining bath is aqueous and contains sufficient iodine to impart the desired stain to the polyvinyl alcohol coated film. Typically this amount ranges from about 0.1% to 2% by weight of the solution. The bath also contains an iodide salt, such as potassium, sodium, lithium or hydrogen iodide which promotes the acceptance of the colored iodine stain into the polyvinyl alcohol. The iodide salt may be present in an amount of from about 1% to about the saturation point of the solution. A more preferred range is from about 10% to about 25%. The optimum quantity can be determined by the skilled artisan. One preferred quantity is about 21% potassium iodide. Preferably the solution may be maintained at a temperature of from about 34° C. to about 41° C. One may optionally include other ingredients in the staining bath as are known in the art, such as alcohols, to promote staining.

The stained films may next be introduced into a boronic stabilizing bath such as is well known in the art. A typical stabilizing bath contains an aqueous solution of 5% borax and 15% boric acid. A typical dwell time is about 90 seconds. The film may then be dried by air or in an oven.

The following non-limiting examples are illustrative of the operation of the present invention.

EXAMPLE 1

Molten polyethylene terephthalate is extruded onto a cold casting drum to form an amorphous cast film. The thusly formed film is then coated with a water soluble copolyester anchor coating comprised of 5-sulfoisophthalic acid (sodium salt), adipic acid, isophthalic acid, terephthalic acid and ethylene glycol. The anchor coating is applied at a 10% aqueous concentration by weight. The method of application is by reverse gravure kiss-roll coater. The coating is subsequently dried by a combination of infrared heat and forced convection.

The anchor coated cast film is then coated with a 20% aqueous solution of Vinol 107 which is a 98.0%-98.8% hydrolized polyvinyl alcohol obtained from Air Products, Inc. of Greenville, S.C. The polyvinyl alcohol is applied via a Meyer rod coater at a rate of 3.4 liters per 1000 square feet. An aqueous acrylic coating is then applied to the previously uncoated side of the film to facilitate winding and film handling. The film is again dried.

The coated cast film is then heated to 95° C.–105° C. and stretched to four times its original width. While still restrained transversely, the film is heated to 160° C. to crystallize the film. The crystallized film is then cooled to 30° C. and wound on a standard 6 inch paper core.

EXAMPLE 2

Film prepared according to the procedure described in Example 1 except that the polyvinyl alcohol used is Vinol 425, a 95.5%-96.5% hydrolized polyvinyl alcohol obtained from Air Products, Inc. of Greenville, S.C.

EXAMPLE 3

Film prepared according to the procedure described in Example 1, except that the polyvinyl alcohol used is Vinol 205, an 87.0%-89.0% hydrolized polyvinyl alcohol obtained from Air Products, Inc. of Greenville, S.C.

EXAMPLE 4

Film prepared according to the procedure described in Example 1, except that the polyvinyl alcohol used is Elvinol 71-30, a polyvinyl alcohol which is at least 99.6% hydrolized and which is obtained from DuPont Chemical Company of Wilmington, Del.

Each of the films prepared in Examples 1 through 4 is then iodine stained by passing the film through a 35° C. bath containing 0.4% $I_2$ and 21% KI in water. The duration of $I_2$ staining is approximately 20 seconds. The iodine is fixed in the polyvinyl alcohol layer by passing the film through a 64° C. bath containing 4.5% borax and 14.5% boric acid in the water. The duration of this treatment is 25 seconds. The film is then air dried at 40° C. for 30 seconds.

The thusly prepared films are then evaluated for iodine visual stain quality, parallel transmission, crossed transmission and percent efficiency. Iodine stain quality is an indication of how uniform the polyvinyl alcohol coating is and how receptive to iodine penetration it is. Parallel transmission (%$T_p$) is the percent of visible light that will travel through two sheets of the stained polarizer with parallel optical planes as measured in a Macbeth densitometer and is an indication of quantity of iodine per unit area, which is a function of PVA coating thickness and the polyvinyl alcohol's ability to be penetrated by aqueous iodine. Cross transmission (%$T_c$) is the percent of visible light that travels through two sheets of polarizer with perpendicular optical planes as measured in a Macbeth densitometer. Equating the parallel and cross transmissions according to the following formula $$\% E = \frac{\% T_p - \% T_c}{\% T_p + \% T_c} \times 100$$

produces the percent efficiency (%E).

Generally, efficiencies of greater than 95% are desired for most polarizer applications, although some applications require only 90% efficiency. Films produced according to Examples 1 through 4 are evaluated in Table 1.

TABLE I

| Example # | PVA % Hydrolysis | $I_2$ Visual Stain Quality | % $T_p$ Parallel Transmission | % $T_c$ Crossed Transmission | % E Efficiency |
|---|---|---|---|---|---|
| 1 | 98.0%–98.8% | Excellent | 32.0% | 1.3% | 96.0% |
| 2 | 95.5%–96.5% | Excellent | 38.0% | 0.7% | 98.1% |
| 3 | 87.0%–89.0% | PVA Washed Off | — | — | — |
| 4 | 99.6% + | Poor, much pattern Too little $I_2$ absorbed | 34.3% | 6.2% | 83.0% |

It can be readily observed that films coated with polyvinyl alcohol containing percent hydrolysis in the range disclosed herein exhibit percent efficiencies of greater than 95%. All films coated with polyvinyl alcohols with percent hydrolysis either below or above the range disclosed herein either do not absorb any iodine or have percent efficiencies too low for practical applications.

What is claimed is:

1. A process for preparing an iodine stainable polyester film which consists of:
   (a) extruding a moving molten web of polyester film; and
   (b) quenching said moving beg to solidify it in a substantially amorphous form; and
   (c) applying an anchor coating to at least a portion of the surface of said film wherein said anchor coating promotes adhesion of polyvinyl alcohol to polyester film; and
   (d) applying a coating of a dispersed aqueous composition of polyvinyl alcohol to at least a portion of the surface of said film; and
   (e) stretching the moving web in a direction transverse to the direction of motion while heating said web at a temperature of from about its glass transition temperature to about 160° C.; and
   (f) crystallizing said moving web by heating it to a temperature in the range of 130° C. to 240° C. without stretching said web; and
   (g) cooling said web to substantially ambient atmospheric room temperature
   (h) subsequently passing said web through a staining bath containing iodine and one or more iodine salts;
   (i) subsequently passing said web through an aqueous stabilizing bath containing boric acid and borax, with the proviso that said polyvinyl alcohol be from 95 to 99 percent hydrolyzed and that the dry coating weight of said polyvinyl alcohol be from 1.0 to about 2.1 pound of coating per thousand square feet of film prior to stretching.

2. The process of claim 1 wherein said polyester film comprises polyethylene terephthalate.

3. The process of claim 1 wherein the temperature in step (e) ranges from about 80° C. to about 110° C.

4. The process of claim 3 wherein the temperature in step (e) ranges from about 90° C. to about 100° C.

5. The process of claim 1 wherein the temperature of step (f) ranges from about 150° C. to about 180° C.

6. The process of claim 2 wherein said web is stretched from about 2 to about 6 times its original width.

7. The process of claim 6 wherein said web is stretched from about 2.5 to about 4.5 times its original width.

8. The process of claim 1 wherein step (f) is performed for about five seconds or more.

9. The process of claim 1 wherein said polyvinyl alcohol coating composition of step (d) comprises an aqueous solution of polyvinyl alcohol wherein said polyvinyl alcohol is present in an amount of from about 2% to about 25% by weight.

10. The process of claim 9 wherein said polyvinyl alcohol is present in an amount of from about 15% to about 20% by weight.

11. The process of claim 1 wherein said polyvinyl alcohol coating weight is about 1.5 dry pounds of coating per thousand square feet of unstretched film.

12. The process of claim 1 wherein said anchor coating of step (c) is produced by polycondensing (A) terephthalic acid; (B) an aliphatic dicarboxylic acid having the formula $HOOC(CH_2)_nCOOH$, n being an integer of from 1 to 11; (c) a sulfomonomer containing an alkali metal sulfonate group attached to a difunctional dicarboxylic aromatic nucleus; and (d) at least one aliphatic or cycloaliphatic alkylene glycol having from about 2 to 11 carbon atoms.

13. The process of claim 12 in said anchor coating comprises an aqueous solution wherein said coating is present in an amount of from about 3% to about 22% by weight.

14. The process of claim 13 wherein said coating is present in an amount of about 10% by weight.

15. The process of claim 12 wherein said anchor coating is present at a coating weight range of from about 0.025 to about 0.1 dry pounds of coating per thousand square feet of unstretched film.

16. The process of claim 15 wherein the coating weight of said anchor coating is about 0.05 dry pounds of coating per thousand square feet of unstretched film.

* * * * *